UNITED STATES PATENT OFFICE.

MOSES W. POWELL, OF CHICAGO, ILLINOIS.

ROOFING-CEMENT.

No. 838,580. Specification of Letters Patent. Patented Dec. 18, 1906.

Application filed June 4, 1906. Serial No. 320,057.

*To all whom it may concern:*

Be it known that I, MOSES W. POWELL, a citizen of the United States, residing in Chicago, in the county of Cook and State of Illinois, have invented a new and useful Improvement in Roofing-Cement, of which the following is a specification.

In the patent granted to me May 19, 1885, No. 318,023, I show and describe a roof the surface of which is composed of tile or brick embedded in cement, while the cement is in a plastic condition, the vertical spaces or joints between the tile or brick being filled with some cement adapted to unite with the tile and become hard, so as to render the surface practically continuous.

My endeavor in the present invention has been to improve the composition of the cement used for the joints, so that the roof in which it is used may possess advantage of being more durable and more perfectly waterproof than heretofore.

The invention consists in the novel composition hereinafter described.

In the manufacture of my improved cement I form a compound consisting of ground asbestos, twenty-five per cent.; soap-stone, five per cent.; mica, two and one-half per cent.; white lead, five per cent.; land-plaster, ten per cent.; sulfur, two and one-half per cent.; roofing-cement, thirty-five per cent.; asphalt, ten per cent, and bitumen, five per cent. Such of these as will soften under heat are heated and melted and then the other ingredients are mixed in, and the resulting composition while warm is applied to the roof as a filling for the joints between the tile of the same. It may also be used both as a bedding and a filling. The roofing-cement which I have used and prefer to use in the manufacture of the invention is composed of asphalt, distilled coal-tar, and actinolite, and the bitumen referred to is the pitch driven off in the early stages of the distillation of coal. This composition is adhesive to the tile, becomes hard as it cools, is non-absorbent, has all necessary strength and toughness, and is affected but little by changes in temperature, so that the joints do not become leaky or otherwise defective.

I claim—

The composition for cementing tile in roofs, consisting of ground asbestos, soapstone, mica, white lead, land-plaster, sulfur, roofing-cement, asphalt and bitumen, substantially in the proportions stated.

MOSES W. POWELL.

Witnesses:
 PEARL ABRAMS,
 PAUL A. DEISS.